US006983809B2

(12) United States Patent
Leitenberger et al.

(10) Patent No.: US 6,983,809 B2
(45) Date of Patent: Jan. 10, 2006

(54) MACHINE TOOL, ESPECIALLY A HAND MACHINE TOOL

(75) Inventors: Thomas Leitenberger, Stuttgart (DE); Gerhard Meixner, Filderstadt (DE); Guenther Schlachter, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/276,139

(22) PCT Filed: Mar. 15, 2001

(86) PCT No.: PCT/DE01/00988

§ 371 (c)(1),
(2), (4) Date: Aug. 1, 2003

(87) PCT Pub. No.: WO01/85399

PCT Pub. Date: Nov. 15, 2001

(65) Prior Publication Data

US 2004/0159449 A1 Aug. 19, 2004

(30) Foreign Application Priority Data

May 11, 2000 (DE) ................................ 100 23 174

(51) Int. Cl.
*B23Q 5/00* (2006.01)

(52) U.S. Cl. ....................................... 173/176; 173/217

(58) Field of Classification Search ................ 173/176, 173/179, 182, 217; 408/8, 124; 335/220
See application file for complete search history.

(56) References Cited

U.S. PATENT DOCUMENTS

| | | | | |
|---|---|---|---|---|
| 3,197,594 | A * | 7/1965 | Schmitt | 337/348 |
| 3,723,929 | A * | 3/1973 | Sitar | 337/38 |
| 4,249,117 | A * | 2/1981 | Leukhardt et al. | 318/275 |
| 4,410,846 | A * | 10/1983 | Gerber et al. | 318/490 |
| 4,454,459 | A * | 6/1984 | Huber | 388/811 |
| 4,536,688 | A * | 8/1985 | Roger | 318/490 |
| 4,562,389 | A * | 12/1985 | Jundt et al. | 318/432 |
| 4,636,961 | A * | 1/1987 | Bauer | 700/168 |
| 4,669,319 | A * | 6/1987 | Heyraud | 73/862.23 |
| 4,689,534 | A * | 8/1987 | Gerber et al. | 388/809 |
| 5,038,084 | A * | 8/1991 | Wing | 318/268 |
| 5,105,130 | A * | 4/1992 | Barker et al. | 318/268 |
| 5,563,482 | A * | 10/1996 | Shaw et al. | 318/272 |
| 5,980,248 | A * | 11/1999 | Kusakabe et al. | 433/27 |
| 6,378,623 | B2 * | 4/2002 | Kawarai | 173/180 |
| 6,607,041 | B2 * | 8/2003 | Suzuki et al. | 173/4 |

FOREIGN PATENT DOCUMENTS

| | | |
|---|---|---|
| DE | 81 02 453 | 10/1982 |
| DE | 39 16 355 A | 12/1989 |
| DE | 41 19 941 A | 1/1993 |
| DE | 297 01 358 U | 4/1997 |

* cited by examiner

*Primary Examiner*—Stephen F. Gerrity
*Assistant Examiner*—Paul Durand
(74) *Attorney, Agent, or Firm*—Michael J. Striker

(57) ABSTRACT

The invention is based on a power tool, in particular a hand power tool, with a drive motor (12) disposed in a housing (10) and at least one adjusting device (14, 16), which can be used to durably set at least one parameter of the drive motor (12) and/or of a transmission during an operating phase.

The invention proposes that the adjusting device (14, 16) have a reset unit (18, 20), which resets the adjusting device (14, 16) to a starting position depending on at least one operating parameter.

14 Claims, 3 Drawing Sheets

MACHINE TOOL, ESPECIALLY A HAND MACHINE TOOL

This is the national stage of PCT/DE01/00988 filed Mar. 15, 2001, which claims priority to German application 100 23 174.8 filed May 11, 2000.

BACKGROUND OF THE INVENTION

The invention is based on a power tool, in particular, a hand power tool.

For most power tools, in particular hand power tools, it is advantageous to be able to vary a drive speed of the drive motor. In hand power tools, it is known to use a control unit to keep the drive speed as constant as possible independent of the load, or to variably adjust the drive speed by means of an adjusting device.

For the adjustment, the operator is frequently provided with an adjusting wheel that can be used to durably set the speed and can limit the speed to a maximal value. The adjusting wheel can also be combined with a potentiometer in the switch trigger so that the adjusting wheel presets the upper limit of the trigger range.

The adjusting wheel can, for example, be used to match the speed to a machining procedure or to a material to be machined. An operator can preselect a speed that can be kept constant while machining a work piece, for example when sawing, grinding, etc.

SUMMARY OF THE INVENTION

The invention is based on a power tool, in particular a hand power tool, with a drive motor disposed in a housing and at least one adjusting device, which can durably set at least one parameter of the drive motor and/or of a transmission during an operating phase.

The invention proposes that the adjusting device have a reset unit, which resets the adjusting device to a starting position depending on at least one operating parameter. Operating errors can be reliably prevented, particularly if the power tool is used by a number of people. The reset unit can advantageously always reset the power tool to a standard operating position from which each operator can start in order to adjust the power tool in the usual manner for his specific intended use. This reliably prevents a new user from overlooking a special adjustment that is unsuited for a particular intended use. Depending on the power tool, it can be advantageous that in the starting position, the power tool can be operated with a maximal possible parameter, which can then be reduced by means of the adjusting device, that in the starting position, the power tool can be operated with a minimally adjusted parameter from which an adjustment should always be started for safety reasons, or that in the starting position, the power tool can be operated with a parameter that lies between a maximal and a minimal parameter.

In power tools, frequently a speed of the tool is crucial to an advantageous machining; to this end, the adjusting device can preferably set a maximal speed as the parameter, either directly by means of the drive machine and/or possibly also by means of a transmission. Besides the maximal speed, it can also be useful in principle to use the adjusting device to establish a minimum speed, which should not be undershot during use.

In addition to a speed, other parameters deemed appropriate by one skilled in the art can also be embodied so that they can be adjusted by means of the adjusting device, such as a minimal and/or maximal transmitted torque and/or an operating stroke, for example in a saber saw or an eccentric grinder, etc.

In another embodiment of the invention, the reset unit resets the adjusting device depending on a period of downtime. A resetting can be achieved in a structurally simple, properly functioning manner.

If the reset unit can be used to adjust the period of downtime after which the reset unit resets the adjusting device, then the power tool can also be adjusted for different fields of application and an unintentional resetting can be reliably prevented; the period of downtime is preferably between one and twenty minutes.

In another embodiment, the invention proposes that the reset unit reset the adjusting device when a power supply is interrupted, for example when a power plug is pulled or when a battery is being changed. Since in particular a power plug of a hand power tool is frequently unplugged or the power supply is interrupted before a change of operators, the change of operators can be detected with a particularly high degree of probability.

Furthermore, there are other conceivable operating parameters, which may be deemed appropriate by one skilled in the art and depending on which the reset unit resets the adjusting device, for example depending on temperature values. The adjusting device can be reset as soon as the power tool has cooled, for example in that a bimetal element releases a detent connection, and/or the adjusting device can be reset if a particular temperature is exceeded, for example in the event of an overload.

A mechanical reset mechanism can be embodied in a structurally simple and inexpensive manner, particularly through the use of a prestressed spring element, which is secured in its position during operation, for example by means of a detent mechanism that is coupled to an on-off switch and is released when the power tool is switched off.

If the reset unit has an electromagnetic adjusting element, the resetting procedure can simply be advantageously coupled to a power supply, for example in that when there is a supply of power, an electromagnet can—directly or by means of a detent mechanism—prevent a reset spring from resetting the adjusting device. If the power supply is interrupted and an attraction force of the electromagnet is neutralized, then the reset spring resets the adjusting device. Besides a mechanical reset spring, the electromagnetic adjusting element can also be combined with other mechanisms deemed appropriate by one skilled in the art, for example electrical and/or hydraulic actuators.

In another embodiment, the invention proposes that the adjusting device have at least one electronic unit, which is for setting the parameter and can be reset by the reset unit. The resetting process can advantageously be coupled to a power supply in the same way as with an electromagnetic unit. Furthermore, the electronic unit can be embodied in a particularly space-saving, lightweight, and inexpensive manner. A mechanical resetting of an adjusting element, e.g. of an adjusting wheel, can be advantageously avoided.

The embodiment according to the invention can be used in various power tools deemed appropriate by one skilled in the art, in particular in hand power tools that are used by a number of operators, for example hand power drills, percussion drills, hammer drills and/or chisel hammers, screwdrivers, right angle grinders, eccentric grinders, saws, planes, etc.

BRIEF DESCRIPTION OF THE DRAWINGS

Other advantages ensue from the following description of the drawings. Exemplary embodiments of the invention are shown in the drawings. The drawings, the specification, and the claims contain numerous features in combination. One skilled in the art will also suitably consider the features individually and will unite them into other appropriate combinations.

DETAILED DESCRIPTION OF THE PREFERRED EMBODIMENTS

Figure 1:
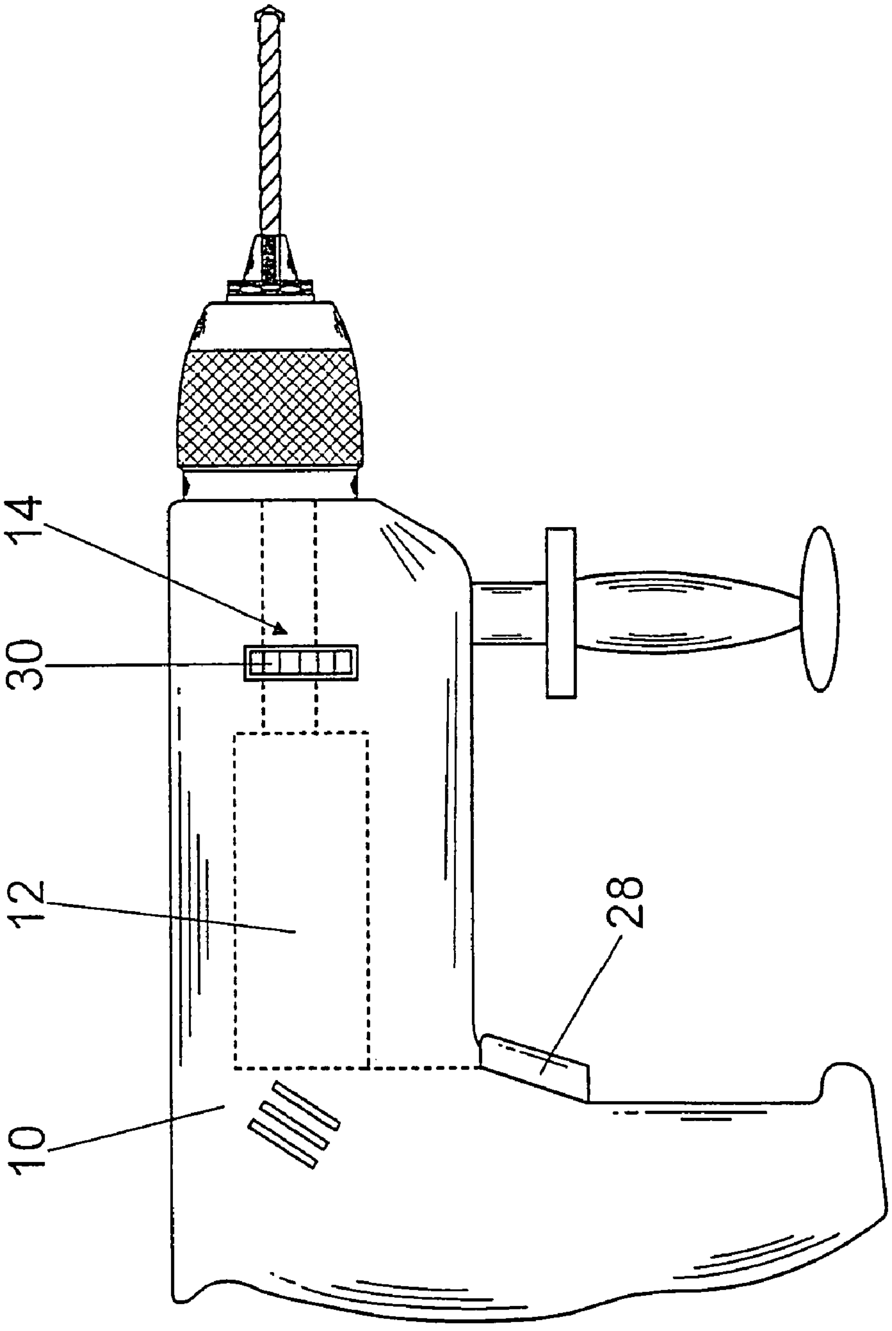
FIG. 1 shows a schematically depicted hand power drill.

FIG. 1 shows a hand power drill with an electric motor 12 disposed in a housing 10. The hand power drill can be turned on and off with a switch 28. For adjusting the speed, the hand power drill has an adjusting device 14 with an adjusting wheel 30, which can be used to set a speed to a particular value. The switch can also be equipped with a potentiometer, which permits it to vary the speed, for example, from 0 to an end value preselected by means of the adjusting wheel.

Figure 2:
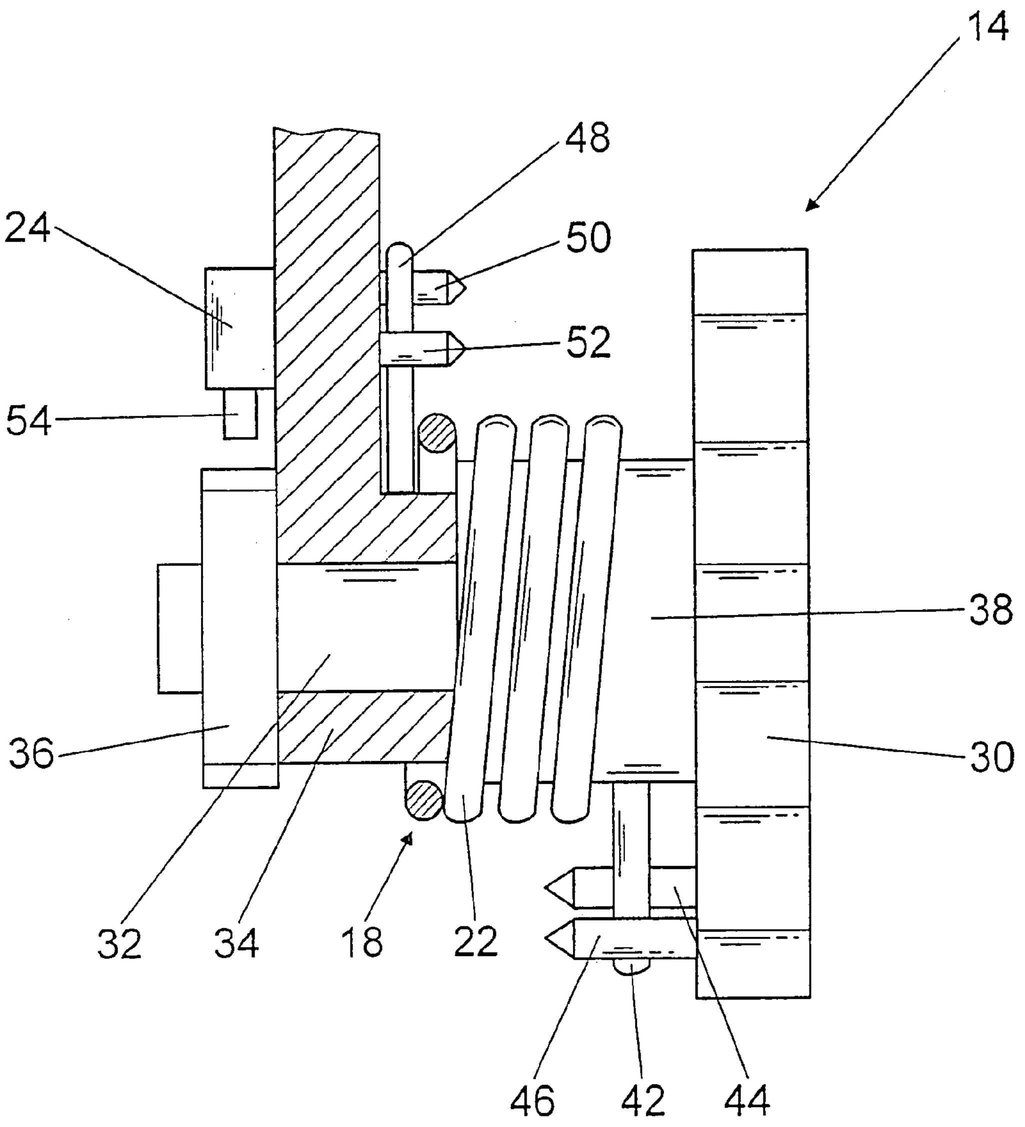
FIG. 2 shows an adjusting wheel with an electromagnetic reset unit.

According to the invention, the adjusting device 14 has a reset unit 18, which resets the adjusting device 14 to a starting position depending on an operating parameter as soon as a power supply is interrupted (FIG. 2). The adjusting wheel 30 is supported so that it can rotate in a housing part 34 by means of an axle 32, which also permits a potentiometer, not shown, to rotate. The axle 32 is secured in the housing part 34 axially in relation to the adjusting wheel 30 by means of a gear 36 fastened to the axle 32 and is secured axially in relation to the gear 36 by means of a flange 38 on the adjusting wheel 30. A helical spring 22 is supported on the flange 38 and, with a first leg 42, engages in a form-fitting manner in the rotation direction between two pins 44, 46 fastened to the adjusting wheel 30 and with a second leg 48, engages in a form-fitting manner between two pins 50, 52 fastened to the housing part 34.

If the hand power drill is connected to a power supply by means of a power plug that is not shown and a power cable, then an electromagnet 24 is supplied with current and moves a ram 54 into a tooth gap of the gear 36. If the adjusting wheel 30 is turned in order to limit a maximal speed that can be set by the switch trigger 28 to a particular value, then the ram 54 can be moved out of its detent position in the gear 36 i.e. out of a tooth gap, counter to the magnetic force of the electromagnet 24. If a tooth gap of the gear 36 comes to rest over the ram 54, then the magnetic force of the electromagnet 24 moves the ram 54 into the tooth gap. The adjusting wheel 30 can be moved in steps that are predetermined by the tooth gaps of the gear 36. If a desired step or a desired speed limitation is achieved, then the adjusting wheel 30 and the potentiometer are immobilized by means of the axle 32, the gear 36, and the ram 54 of the electromagnet 24 engaging in the tooth gap of the gear 36. Moving the adjusting wheel 30 places the helical spring 22 under stress.

If the power plug is pulled after an operating phase, and the power supply to the electromagnet 24 is interrupted, the helical spring 22 can move the ram 54 out of the tooth gap of the gear 36. The helical spring 22 resets the adjusting wheel 30 and the potentiometer into their starting positions and the speed limitation is cancelled so that the hand power drill can be operated at a maximal possible speed by means of the switch trigger 28. The gear 36 and the electromagnet 24 with the ram 54 advantageously serve to graduate the adjusting range of the adjusting wheel 30, to lock the adjusting wheel 30 during an operating phase, and to advantageously embody a reset mechanism.

Figure 3:
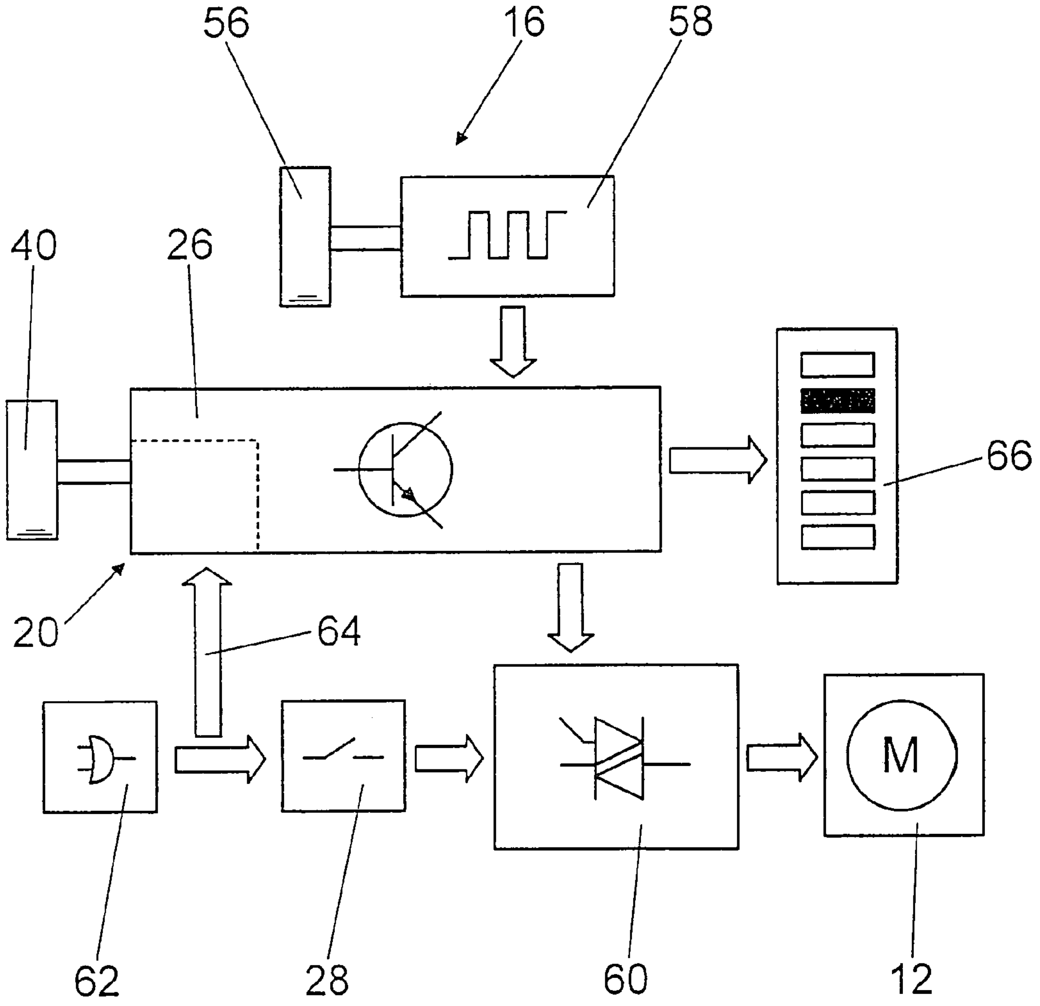
FIG. 3 shows an adjusting wheel with an electronic control unit.

FIG. 3 shows an alternative adjusting device 16 with an adjusting wheel 56. In principle, components that remain essentially the same are labeled with the same reference numerals. For features and functions that remain the same, the reader should refer to the description of the exemplary embodiment in FIGS. 1 and 2.

The adjusting wheel 56 is connected by means of a pulse generator 58 to an electronic control unit 26, which provides a speed governor 60 with a set point value. Instead of a pulse generator, however, it is also possible to provide an endless potentiometer. If the hand power drill is connected to a source of current by means of a power supply 62 with a power plug and a power cable, then a line 64 supplies the control unit 26 with current independent of the actuation of the switch 28. The adjusting wheel 56 can then be used to adjust the speed of electric motor 12 to a particular value. The adjusted speed is indicated on a display 66. If the adjusting wheel 56 has reached an adjusting limit in one of its rotation directions, the adjusting wheel 56 can be rotated further without changing the speed setting.

If the power plug is pulled and the supply of current to the control unit 26 is interrupted or if a particular period of downtime has been reached, i.e. the hand power drill has not been actuated for a particular amount of time, then a reset unit 20 contained in the control unit 26 resets the control unit to its starting position and the previously selected speed is cancelled so that the hand power drill can be operated at a maximal possible speed. The period of downtime after which the reset unit 20 resets the control unit 26 can be adjusted by means of an adjusting wheel 40 to a period from two to twenty minutes.

Instead of an adjusting wheel, it is also conceivable to provide a different adjusting element deemed appropriate by one skilled in the art for adjusting the speed limitation, such as a switch rocker, one or more actuating knobs, etc.

REFERENCE NUMERAL LIST

10 housing
12 drive motor
14 adjusting device
16 adjusting device
18 reset unit
20 reset unit
22 spring element
24 adjusting element
26 electronic unit
28 switch
30 adjusting wheel
32 axle
34 housing part
36 gear
38 flange
40 adjusting wheel
42 leg
44 pin
46 pin
48 leg
50 pin
52 pin
54 ram

56 adjusting wheel
58 pulse generator
60 speed governor
62 power supply
64 line
66 display

What is claimed is:

1. A power tool in the form of a hand power tool, comprising:

a drive motor (12) disposed in a housing (10) and at least one adjusting device (14, 16) comprising an adjusting wheel (30, 56), wherein the adjusting wheel (30, 56) can be used to durably set at least one parameter of the drive motor (12) during an operating phase, wherein the adjusting device (14, 16) has a reset unit (18, 20), wherein the reset unit resets the adjusting device (14, 16) to a starting position depending on at least one operating parameter, wherein the reset unit resets the a adjusting device depending on a detected temperature value.

2. A power tool in the form of a hand power tool, comprising:

a drive motor (12) disposed in a housing (10) and at least one adjusting device (14, 16) comprising an adjusting wheel (30, 56), wherein the adjusting wheel (30, 56) can be used to durably set at least one parameter of the drive motor (12) during an operating phase, wherein the adjusting device (14, 16) has a reset unit (18, 20), therein the reset unit resets the adjusting device (14, 16) to a starting position depending on at least one operating parameter, wherein the reset unit (18) has an electromagnetic adjusting element (24).

3. A power tool in the form of a hand power tool, comprising:

a drive motor (12) disposed in a housing (10) and at least one adjusting device (14, 16) camp sing an adjusting wheel (30, 56), wherein the adjusting wheel (30, 56) can be used to durably set at least one parameter of the drive motor (12) during an operating phase, wherein the adjusting device (14, 16) has a reset unit (18, 20), wherein the reset unit resets the adjusting device (14, 16) to a starting position depending on at least one operating parameter, wherein the reset unit (20) resets the adjusting device (16) depending on a period of downtime, and wherein the reset unit (20) can adjust the period of downtime after which the reset unit (20) resets the adjusting device (16).

4. The power tool according to claim 3, wherein the adjusting device (14, 16) can set a maximal transmitted speed as a parameter.

5. The power tool according to claim 3, wherein the adjusting device can set a maximal transmitted torque as a parameter.

6. The power tool according to claim 3, wherein the period of downtime is between one minute and twenty minutes.

7. The power tool according to claim 3, wherein the reset unit (18, 20) resets the adjusting device (14, 16) when a power supply is interrupted.

8. The power tool according to claim 3, wherein the reset unit resets the adjusting device depending on a detected temperature value.

9. The power tool according to claim 3, wherein the reset unit (18) has a mechanical reset mechanism.

10. The power tool according to claim 9, wherein the reset mechanism resets the adjusting device (14) by means of a prestressed spring element (22).

11. The power tool according to claim 3, wherein the reset unit (18) has an electromagnetic adjusting element (24).

12. The power tool according to claim 3, wherein the adjusting device (16) has at least one electronic unit (26), wherein the at least one electronic unit is for adjusting the parameter and can be reset by means of the reset unit (20).

13. The power tool according to claim 3, wherein the adjusting device (14, 16) can set a minimal transmitted speed as a parameter.

14. The power tool according to claim 3, wherein the adjusting device (14, 16) can set a minimal transmitted torque as a parameter.

* * * * *